UNITED STATES PATENT OFFICE.

RICHARD WILLSTÄTTER, OF MUNICH, GERMANY, ASSIGNOR TO THE FIRM OF E. MERCK, OF DARMSTADT, GERMANY.

PROCESS OF MAKING PSEUDOTROPIN.

SPECIFICATION forming part of Letters Patent No. 585,610, dated June 29, 1897.

Application filed April 24, 1897. Serial No. 633,764. (No specimens.) Patented in Germany March 15, 1896, No. 88,270.

*To all whom it may concern:*

Be it known that I, RICHARD WILLSTÄTTER, a subject of the Emperor of Germany, residing at Munich, Bavaria, in the German Empire, have discovered and invented a new Process for Obtaining a Chemical Product, the following being a full, clear, and exact description thereof, and for which I have obtained a patent in Germany, No. 88,270, dated March 15, 1896.

My invention relates to a new and useful process for obtaining pseudotropin ($C_8H_{15}NO$) directly from tropin by isomeric conversion, consisting in treating tropin ($C_8H_{15}NO$) with alkalies at elevated temperature, preferably by boiling for several hours with a concentrated amyl-alcoholic solution of sodium amylate. The result of the reaction thus instituted is a large share of pseudotropin mixed with but little unchanged tropin and a slight proportion of high-boiling syrupy compounds. Instead of the sodium-amylate solution other forms of alkaline reagents, particularly high-boiling alcoholate solutions, may be employed. The pseudotropin thus obtained when further purified, as below described, exhibits the melting-point 108° centigrade and boiling-point 240° to 241° centigrade, both markedly different from those of tropin. It agrees herein very closely with the pseudotropin as obtained by C. Liebermann from the so-called "tropacocain," ($C_{15}H_{19}NO_2$,) one of the minor alkaloids of the coca plant. (See *Ber. d. d. Chem. Ges.*, vol. 24, p. 2336.) It is, furthermore, well characterized by its readily-obtainable benzoyl derivative "benzoyl-pseudotropein," ($C_{15}H_{19}NO_2$,) which, in its melting-point of 49° centigrade as well as in all its other properties, coincides wholly with the previously-mentioned natural plant base known as "tropacocain."

An example of the manufacture of pseudotropin by my process is the following: Dissolve twenty grams of sodium in two hundred grams of amylic alcohol, bring to boil, add a solution of ten grams of tropin in ten grams of amylic alcohol, continue to boil for two hours and fifteen minutes. Before the boiled mixture has quite cooled down add eighty grams of water and shake well. Upon restored quiescence separate the amyl-alcoholic stratum from the aqueous, extract the latter with ether. Then shake this ethereal solution as well as the amyl-alcoholic stratum that was left before with diluted hydrochloric acid. Unite the two hydrochloric solutions of the base thus obtained, free the whole from traces of amyl alcohol by steam or by ether, saturate with an alkali, take up the base with ether, evaporate the ethereal solution. Purify the residue by fractional distillation and by recrystallization from benzene to which some ligroin has been added. A seventy-five-per-cent. yield of pure pseudotropin is to be expected.

The ulterior uses of pseudotropin are medicinal. For this purpose it is converted into some of its tropein forms, especially into that of benzoyl-pseudotropein, (identical with tropacocain, the medical uses of which are known.)

Having thus described my invention, what I claim, and desire to secure by Letters Patent, is—

The process of obtaining pseudotropin, an isomer of tropin, consisting in subjecting tropin to the action of alkalies at elevated temperature.

RICHARD WILLSTÄTTER.

Witnesses:
 LOUIS MERCK,
 W. CONZEN.